United States Patent
Rekhi

(10) Patent No.: US 9,519,889 B2
(45) Date of Patent: Dec. 13, 2016

(54) AUTOMATIC DISCOVERY OF HOW AND WHEN PEOPLE MET

(71) Applicant: LinkedIn Corporation, Mountain View, CA (US)

(72) Inventor: Sachin Rekhi, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 351 days.

(21) Appl. No.: 13/683,878

(22) Filed: Nov. 21, 2012

(65) Prior Publication Data

US 2014/0143685 A1    May 22, 2014

(51) Int. Cl.
*G06F 3/048*    (2013.01)
*G06Q 10/10*    (2012.01)
*G06Q 50/00*    (2012.01)

(52) U.S. Cl.
CPC ............ *G06Q 10/109* (2013.01); *G06Q 50/01* (2013.01)

(58) Field of Classification Search
CPC .............................. G06Q 50/01; G06Q 10/109
USPC ................................................. 715/751, 753
See application file for complete search history.

(56) References Cited

U.S. PATENT DOCUMENTS

| | | | |
|---|---|---|---|
| 8,484,186 B1* | 7/2013 | Kapczynski et al. | 707/706 |
| 2006/0085373 A1* | 4/2006 | Dhillion et al. | 707/1 |
| 2009/0265326 A1* | 10/2009 | Lehrman et al. | 707/4 |
| 2010/0005520 A1* | 1/2010 | Abbot et al. | 726/6 |
| 2011/0151850 A1* | 6/2011 | Haaparanta | H04M 1/2745 455/415 |
| 2013/0111356 A1* | 5/2013 | Vasudevan et al. | 715/753 |
| 2013/0218902 A1* | 8/2013 | Vendrow et al. | 707/748 |
| 2014/0143685 A1* | 5/2014 | Rekhi | 715/753 |

* cited by examiner

*Primary Examiner* — Ajay Bhatia
*Assistant Examiner* — Phuong Nguyen
(74) *Attorney, Agent, or Firm* — Schwegman Lundberg & Woessner

(57) ABSTRACT

A system, computer-readable storage medium, and computer-implemented method for automatic discovery of how and when people met is provided. A plurality of signals are analyzed to determine a level of significance of each of the plurality of signals in providing a suggested entry into a data field of a contact management system designated to provide a description of how a user met a contact. In response to at least one signal of the plurality of signals exceeding a threshold level of significance, a suggested entry for the data field of the contact management system is determined. The suggested entry of how a user met a contact is automatically displayed to a user.

18 Claims, 5 Drawing Sheets

FIG. 4

AUTOMATIC DISCOVERY OF HOW AND WHEN PEOPLE MET

TECHNICAL FIELD

This patent document pertains generally to data processing systems, and more particularly, but not by way of limitation, to techniques for analyzing various information for the purpose of automatically discovering the circumstances around two people becoming acquainted with one another, such that information indicating how and when the two people met can be recorded in an address book.

BACKGROUND

Users of the Internet and mobile telecommunication systems retain contact information across a broad range of contact management systems provided by online sites such as networking sites, contact aggregators, address book providers, e-mail providers, and calendar systems. The content of the contact information retained at these sites often includes or is directly related to e-mail, meeting schedules, calendar event notifications, and telephone call transcriptions, blogs, and postings. Of course these networking sites collectively include listings of all the contacts related by this content.

It is often important for a user to recall exactly how and when the user met a particular contact for which information is retained on one of the above referenced online sites. Recollection of such information can be very useful to a user at later date, especially when the particular contact is a part of the user's professional network or a potential sales contact of the user. Additionally, it may be to the user's advantage to keep track of a third party that introduced the user to a contact. A user may benefit from being able to identify third parties who frequently introduce the user to new contacts because those third parties are likely to provide additional contacts that may allow a user to expand their professional or sales networks.

Users wishing to record information about how and when the user met a contact are left with limited options for the traditional online sites referenced above. If the online site provides a general notes field, the user may record the explanation of how a user met the contact in that field. However, the organization and difficulty in relocating this information can make the process inefficient. Further, users often do not add sufficient detail to such notes and the information may then be rendered useless to the user because the information is not complete enough to jog the user's memory concerning the actual circumstances around the initial meeting of the contact. Moreover, users frequently do not record this information immediately after the new contact has been added and the information concerning how and when the user met the contact is often forgotten.

BRIEF DESCRIPTION OF DRAWINGS

Some embodiments are illustrated by way of example and not limitation in the figures of the accompanying drawings in which:

FIG. 4 is an interface diagram illustrating a user display of a suggested entry into a data field of a contact management system, as may be used in an example embodiment;

DETAILED DESCRIPTION

Figure 1:
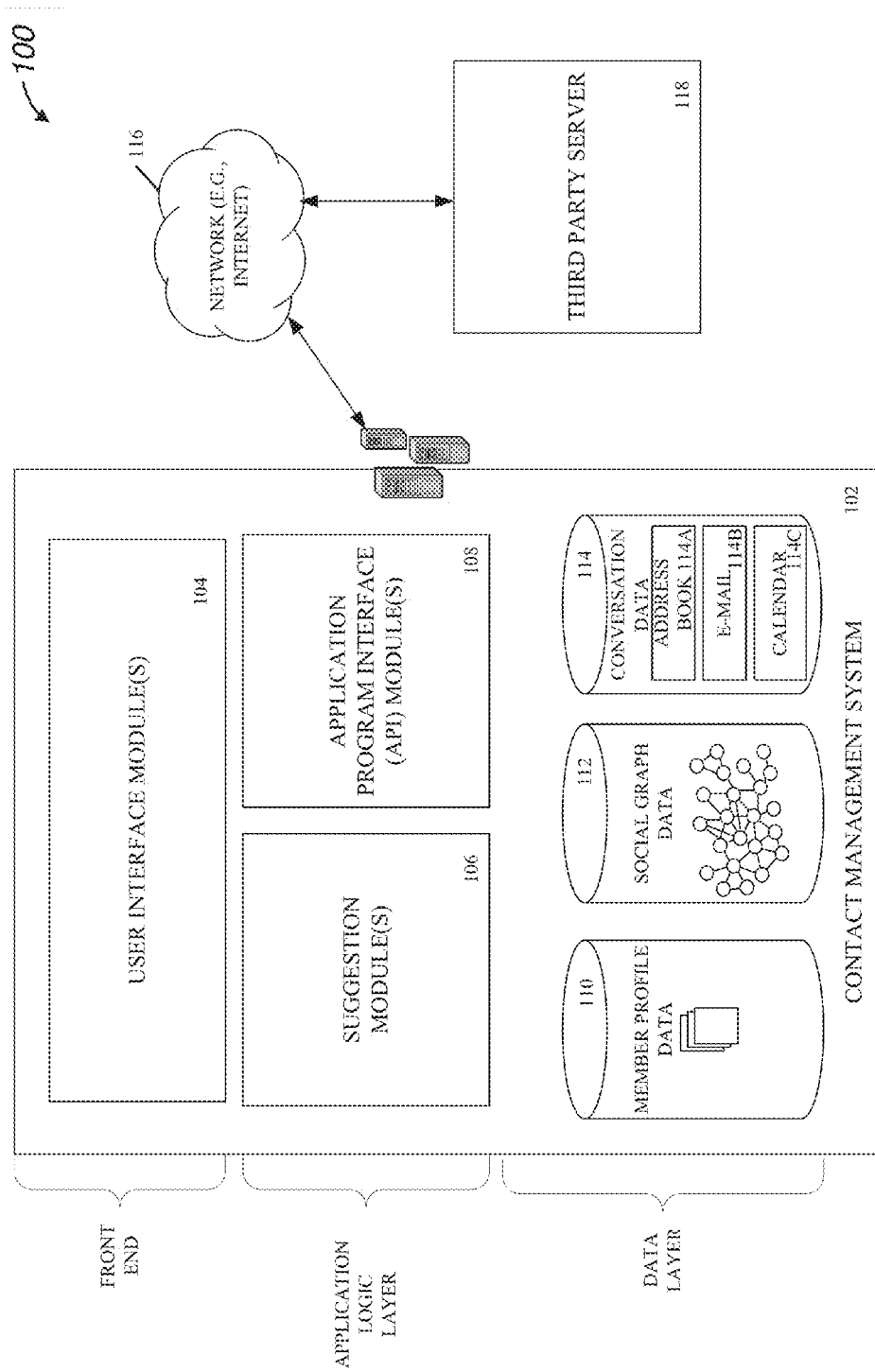
FIG. 1 is a block diagram illustrating a system for automatic discovery of how and when people met, as may be used in an example embodiment.

The present disclosure describes methods, systems and computer program products for providing a user with a suggested description of how and when the user met a person, who is represented as a contact in a list of contacts maintained by a contact management system. In the following description, for purposes of explanation, numerous specific details are set forth in order to provide a thorough understanding of some example embodiments. It will be evident, however, to one skilled in the art that the present invention may be practiced without these specific details.

Consistent with embodiments of this invention, the suggested description of how a user met a person is provided to the user in a dedicated field of a contact record for the person as maintained by the contact management system. The dedicated field is designated specifically for storing that type of information. Each of the contacts maintained by the contact management system may have a designated field for this information. Each suggestion of how the user met the contact may be confirmed, rejected or edited by the user.

Each suggestion of how and when a user met a contact is automatically provided to the user upon addition of the contact to the content management application, or at some subsequent time, typically during an interaction that the user has with the contact record for the particular contact. The suggestion of how and when a user met a contact is determined from several pieces of data associated with the user. This data may be from a number of different sources including, for example, social network profile data (e.g., LinkedIn, Facebook, Twitter), social network message history, locally installed email clients (e.g., Microsoft Outlook), browser based email clients (e.g., Gmail, Yahoo! Mail, Hotmail), electronic calendar applications, and phone call transcripts, and other similar data sources.

In one embodiment, a suggestion for how and when a user met a contact may be based on a single piece of information extracted from any one of the above referenced data sources. For example, a user sharing the same educational domain name email address as a contact may be provided the suggestion that the user met the contact while attending the same educational institution.

Additionally, a suggestion for how and when a user met a contact may be based on multiple pieces of information. For example, electronic calendar data from both the user and the contact may indicate that both attended the same event and social network profile data may indicate the user added the contact as a connection the day after the event. In this example, the contact management system may provide a user with the suggestion that the user met the contact at an event based on the information provided by the electronic calendar data and social network profile data.

According to certain aspects of the present disclosure, each piece of data used in determining how and when a user met a contact is weighted according to its significance in making that determination. For example, a user may have the same employer listed in a social network profile as a contact and the user may have the same educational domain name email address as a contact, but with a date of attendance that is separated by ten years. In this example, the contact management system would recognize that the number of years separating the attendance of a certain university makes the fact that the user and the contact attended the same university less significant in determining how and when the user met the contact. Following this example, the user may be provided a suggestion that the user met the contact while working for the same employer.

FIG. 1 is a block diagram illustrating various functional components of an example system 100 for providing a suggested description of how and when a user met a contact, according to an example embodiment. As shown in FIG. 1, the contact management system 102 is generally based on a three-tiered architecture, consisting of a front-end layer, application logic layer, and a data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 104, which receives requests from various client-computing devices, and communicates appropriate responses to the requesting client devices. For example, the user interface module(s) 104 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including member profile databases 110, which stores general information contained on a social network profile, including general contact information, employer information, educational institution information, as well as information concerning various online or offline groups. Member profile database 110 may contain information for member profiles for only a single social network profile or for profiles on several different social networks.

Consistent with some embodiments, when a person initially registers to become a member of the social network service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in the member profile database 110. Member profile database may also contain contact information such as lists of contacts, previous employers, interests, organizational affiliations, as well as personal and professional: addresses, phone numbers and websites.

As shown in FIG. 1, the data layer also includes social graph database 112, which is a particular type of database that uses graph structures with nodes, edges, and properties to represent and store data. Of course, with various alternative embodiments, any number of other entities might be included in the social graph, and as such, various other databases may be used to store data corresponding with other entities.

Once registered, a member of a social network service may invite other members, or be invited by other members, to connect via the social network service. A "connection" may require a bi-lateral agreement by the members, such that both members acknowledge the establishment of the connection. Similarly, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. For purposes of the present disclosure, the term "connection" shall include both the bi-lateral agreement by both members and the unilateral operation of "following". Each of the connections of a user may be included in social graph database 112.

A social network service may also provide a broad range of other applications and services that allow members the opportunity to share and receive information, often customized to the interests of the member. For example, a social network service may include a photo sharing application that allows members to upload and share photos with other members. As such, at least with some embodiments, a photograph may be a property or entity included within a social graph. Members of a social network service may be able to self-organize into groups, or interest groups, organized around a subject matter or topic of interest. Accordingly, the data for a group may be stored in database 112. When a member joins a group, his or her membership in the group will be reflected in the social graph data stored in the database with reference number 112. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 112.

As shown in FIG. 1, the data layer also includes conversation database 114, which may include information from various online services including an address book data 114a from electronic address book provider, email data 114b from an e-mail provider, and a calendar data 114c from an electronic calendar provider. In one embodiment, the electronic address book provider, email provider, and electronic calendar provider may each be hosted on a third party server (e.g., third party server 118).

In the aggregate, the conversation database 114 may contain conversation content information including e-mail, calendar event notifications, meeting schedules, instant messaging histories, and telephone call transcripts. The types of conversation data contained in conversation database 110 may extend far beyond the examples presented. Any given one of the conversation data providers may only contain a portion of the conversation data and correlate that information according to the type of user interests that one networking site supports.

As illustrated in FIG. 1, the application layer of the contact management system 102 includes a server that includes at least one processing device configured to implement at least the respective contact management processes discussed herein. The contact management system 102 includes a computer memory storing a contact database that in turn includes such address book system elements as contact entries and a set of merged contacts as well as the respective contact identifiers, merged contact records, and sets of merged contact fields.

Each of the sets of social network connections, as referenced above in relation to the social graph data 112, and source contacts, as referenced above in relation to the conversation database 114, may be synchronized with and maintained as a merged contact in the contact list of the contact management system 102. Not every connection or source contact at every social network service or other online service (e.g., address book provider, email provider, calendar provider) may correspond to a contact in the contact list within the contact management system 102. Connections and source contacts corresponding to a merged contact in the contact list may be synchronized with a contact entry within a set of contact entries. Each of the contact entries is subject to a deduplication process to assure the respective contact entry corroborates with a particular merged contact. For those contact entries that do not contain duplicate contact entry elements, a merging process combines a most recent and unique set of contact identifiers into merged contact fields with an a respective merged contact record. Each respective merged contact record corresponds to a merged contact in the set of merged contacts and makes up one entry in the contact list.

Each respective contact entry maintained by the contact management system 102 may include one or more data fields to specify additional information about the contact. In an example embodiment of the contact management system 102, each respective contact entry includes a data field to describe how the user met each respective contact.

As illustrated in FIG. 1, with some embodiments the contact management system 102 is implemented as its own application server module such that it operates as a stand-alone application. However, with various alternative embodiments, the contact management system 102 may be implemented as a service that operates in conjunction and is integrated with a social network or other online service. With some embodiments, the contact management system 102 may include or have an associated publicly available application program interface (API) module 108 that enables third-party applications to invoke the functionality of the contact management system 102 over communication network 116.

As illustrated in FIG. 1, the contact management system 102 may include API module 108, which, is coupled to and provides programmatic interfaces to one or more suggestion modules 106. In one embodiment, the API module 108 may obtain information over communication network 116 from the third party server 118 to be stored in databases 110, 112, or 114 and later utilized by the suggestion module 106 in determining a suggested entry for the contact management system 102. The third party may, for example, be a social network service, an address book provider, an email provider or a calendar provider. The suggestion modules 106 are, in turn, coupled to the one or more databases 110, 112 and 114.

Generally, the suggestion module 106 takes as input parameters several pieces of information from each of the databases 110, 112, and 114. The suggestion module 106, discussed in further detail below, analyzes each piece of information received from databases 110, 112 and 114 to determine the level of significance of each piece of information in providing an entry to a data field associated with a contact entry maintained by the contact management system 102. Consistent with embodiments of the invention, the data field entry may include a description of how and when a user met a contact. Information rising above a certain level of significance may be used by the suggestion module 106 in determining a suggested entry for the contact management system 102. This suggested entry may then be presented to a user device (not shown) by the user interface module 104. Details of the modules and processes comprising the suggestion module 106 are presented in greater detail below with respect FIG. 2.

FIG. 1 also illustrates a third party server 118 as having programmatic access to the communication network 116. The third party server 118 may be coupled via an API server to the communication network 116, for example, via wired or wireless interfaces. The communication network 116 may be a LAN, a WAN, the Internet, or other packet-switched data network. Accordingly, a variety of different configurations are expressly contemplated.

In one embodiment, the third party server 118 may, utilizing information retrieved from the communication network 116, support one or more features or functions of the contact management system 102 on a website hosted by the third party. The third party website may, for example, be a social network service having a plurality of users each having a plurality of contacts to be managed by the contact management system 102.

Figure 2:
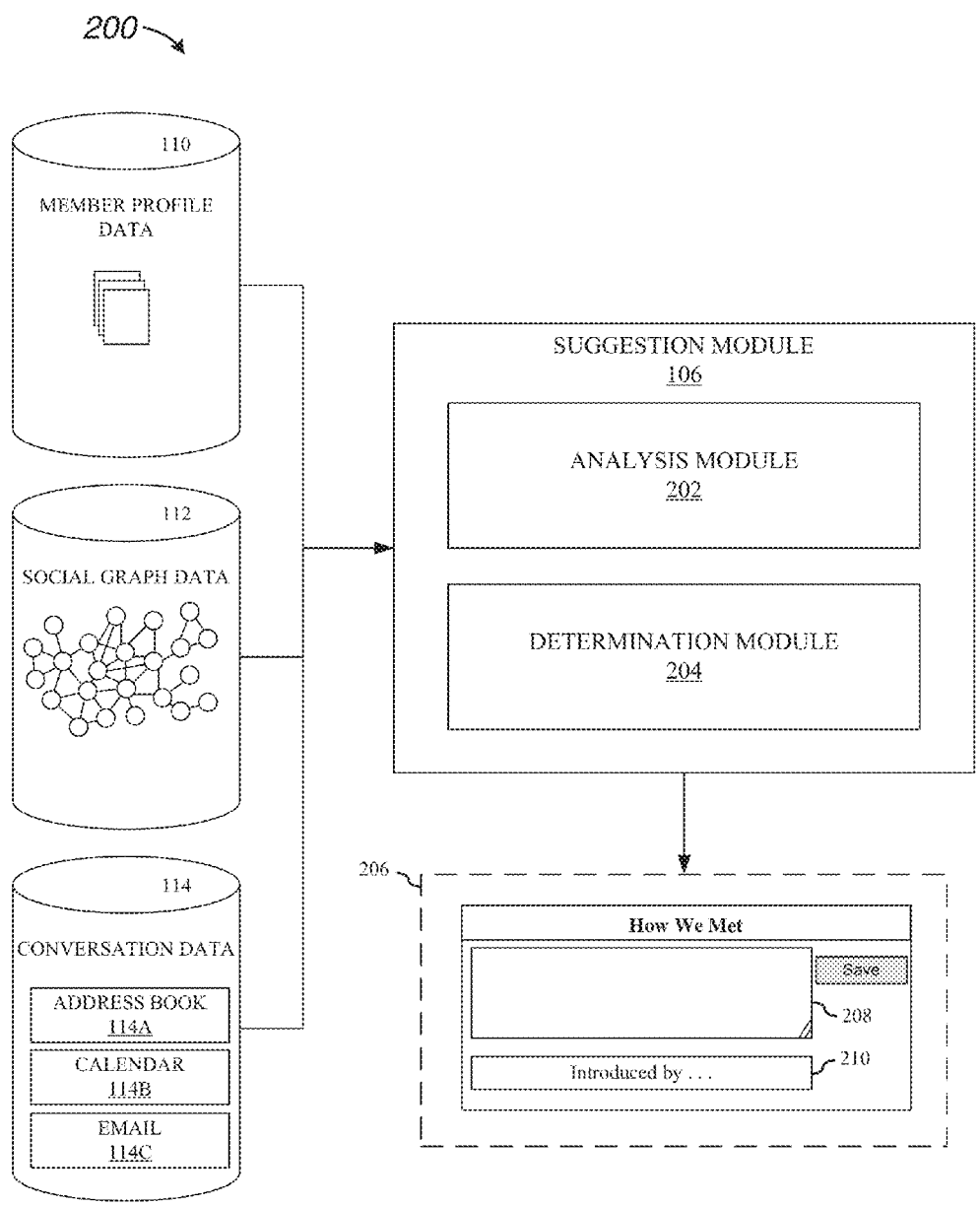
FIG. 2 is a block diagram illustrating contact management system modules, according to some example embodiments.

FIG. 2 is a block diagram illustrating various functional modules that are part of a contact management system, according to some example embodiments. As discussed in reference to FIG. 1, suggestion module 106 receives as inputs, a plurality of signals from each of the member profile databases 110, social graph data 112, and behavioural database 114. Each of the signals received from the databases 110, 112 and 114 represents the information discussed above in reference to each of the databases 110, 112, and 114. Each of these signals may be used by the suggestion module 106 to suggest an entry into data field 206.

Data entry box 206 is an entry field to facilitate input (or confirmation) of data that is stored for each of the contact entries maintained by the contact management system 102. Data entry box 206 is a designated entry field to provide an indication of how and when a user met the contact corresponding to each contact entry. Data entry box 206 may include data entry field 208, which provides a description of the particular details regarding how a user and a contact met. These details may, for example, include a date, a time, a location, an event, a communication or any combination therein, which is associated with the initial meeting of the user and the contact. In some embodiments, data entry box 206 also includes data entry field 210, which provides an indication of a third party who introduced the user and the contact. The third party may or may not be an additional contact of the user.

Consistent with embodiments of the invention, the suggestion module 106 may include an analysis module 202, which receives each of the input signals from each of the member profile databases 110, social graph databases 112, and behavioural databases 114 and analyzes them to determine the level of significance of each in providing a description of how the user initially met the contact. The signals analyzed by the analysis module 204 may include, for example, educational background, employment history, calendar event notifications, schedule history, communication history (e.g., e-mail, instant message, chat, social network messaging, SMS, telephone call), social network connections, social network connection timing, social graph data, other social network profile information and any other information discussed in reference to databases 110, 112, and 114.

Consistent with some embodiments, each signal received by the suggestion module 106 may be assigned a relative weight according to the level of significance. The level of significance assigned to each signal is dependent on several factors. With some embodiments, these factors may include, for example, the relative timing of each piece of information and the respective relationships between each piece of information. For example, information received from the member profile database 110 and social graph data 112 may indicate that the user and the contact both received a calendar event invitation to the same event and may further indicate that the user added the contact as a social network connection. In this example, the analysis module 202 may assign a greater weight to these pieces of information if the event and social network connection addition occurred within the same day rather than being separated by several months.

In some embodiments, the level of significance assigned to each signal depends on the particular type of information for which the level of significance is being determined. For example, employment history information received from the member profile database 110 and social graph data 112 may indicated that the user and the contact were both employed by the same employer in the past. In this example, the analysis module 202 may assign a lower weight to this piece of information if the employer has over 500 employees than if the employer had only 50 employees.

As illustrated by FIG. 2, suggestion module 106 may also include determination module 206 operatively coupled to the analysis module 204. Using the level of significance of each signal, as determined by the analysis module 204, determination module 206 determines a suggested description of how a user met a contact of the user. This suggestion is provided to a user via user interface module 104 as a suggested entry to data entry field 208, and optionally, a further entry to data entry field 210 of data entry box 206.

Determination module 206 makes the determination of the suggested entry in response to one or more of the signals received from databases 110, 112 and 114 exceeding a threshold level of significance. With some embodiments, the threshold level of significance may be based, for example, on rules-based module defined by heuristic methods used in inferring how a user met a contact. With other embodiments, the level of significance may be based on the number of input signals received of the number of received input signals have any significance in determining how a user met a contact.

Consistent with embodiments of the present invention, the determination module 206 may infer how the user met the contact using one or more of the signals received from the databases 110, 112 and 114 that exceed the threshold level of significance. The signals used by the determination module 206 in making the determination may include, for example, educational history, employment history, calendar event history, communication history (e.g., e-mail, instant message, chat, social network messaging, SMS, telephone call), social network connections, social network connection timing, other social network profile information and any other information discussed in reference to databases 110, 112, and 114. For example, the determination module 206 may infer that the user met the contact while attending the same school, if the user and the contact each have an email address having a domain name corresponding with the same school. In this example, the determination module 206 may also make the determination that the user and contact met each other while attending the same school if both the user and the contact have the same school listed in an education history field of a social network profile. In another example, the determination module 206 may determine that the user met the contact while both were employed at the same employer based on the user and the contact having the same employer listed in an employment history field of a profile of a social network. In this example, the determination module may infer that the user and the contact met while working for the same employer if both the user and the contact belong to a group of users of a social network that the system determines to be a group of employees of an employer based on the social data associated with each member of the group. In yet another example, the determination module 206 may infer that the user met the contact while attending the same event if both the user and the contact received a calendar invitation to the same event and the user added the contact to the contact management system shortly after the date of the event. In still another example, the determination module 206 may infer that the user met the contact through some form of communication which was the communication between the contact and the user. In this example, the communication may be an e.g., e-mail, instant message, chat, social network messaging, SMS, phone call.

In some embodiments, the determination module 206 may provide a suggestion of a third party who may have introduced the user and the contact if one or more of the signals exceeding the threshold is also associated with the third party. For example, if a user and a contact first communicate through an email thread originally sent by a third party to the user, the determination module 206 may determine that the user and the contact met through the email. In this example, the determination module 206 may further infer that the third party, who originally sent the email, introduced the user and the contact.

Methods

Figure 3:
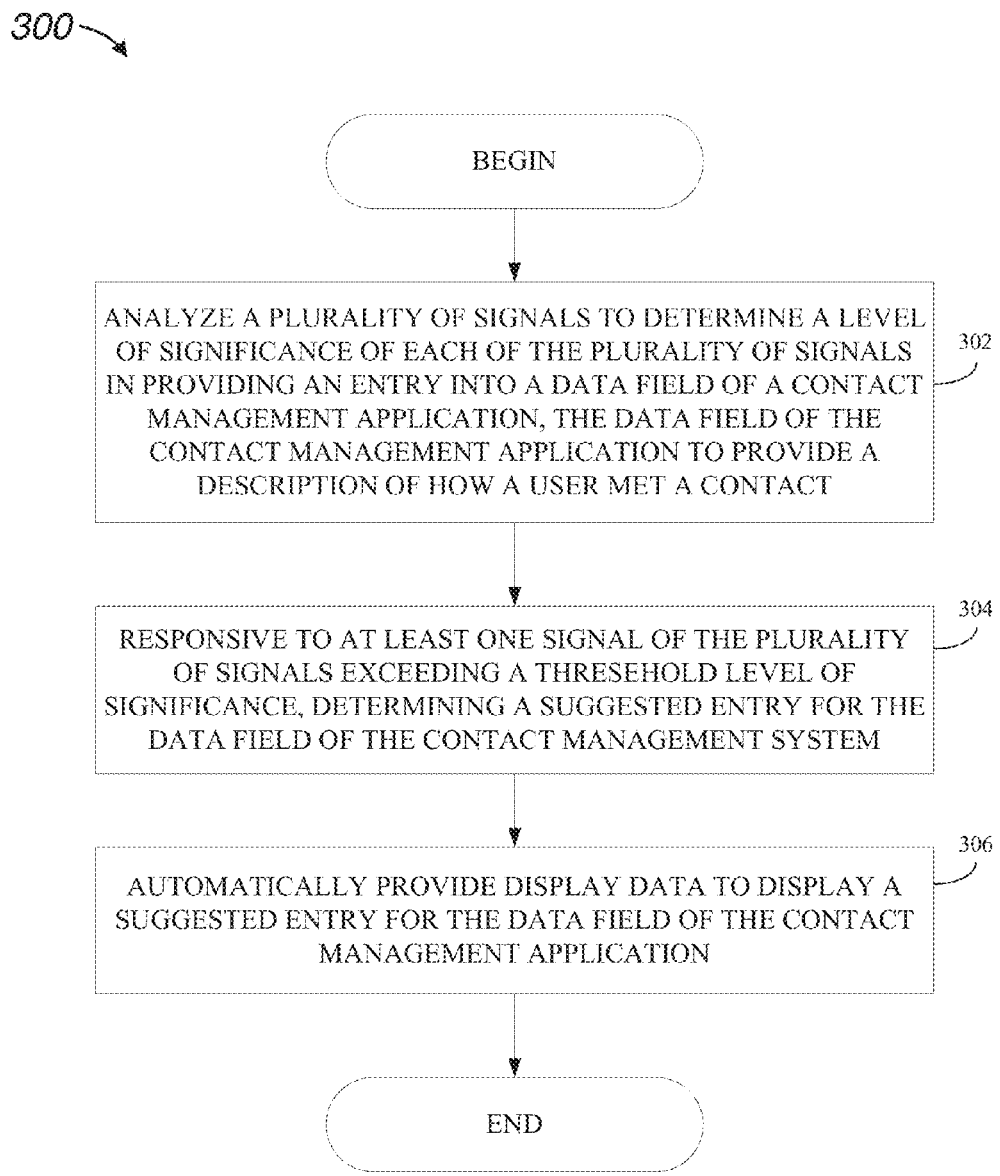
FIG. 3 is a flow chart illustrating a method of automatic discovery of how and when people met, according to an example embodiment.

FIG. 3 is a flow chart illustrating a method 300 of automatic discovery of how and when people met, according to example embodiment. At block 302 the analysis module 202 may analyze a plurality of signals received from data base 110, 112 and 114. Each of the signals is analyzed by the analysis module 202 to determine the level of significance of each in providing an entry to an entry data field (e.g., data fields 208 and 210) of a contact management system (e.g. contact management system 102). The data field of the contact management system to provide a description of how a user met a contact, which corresponds to a contact entry in the contact management system. In some embodiments, the description of how a user met a contact may include, for example, a date, a time, a location, an event, a communication or any combination therein, which is associated with the initial meeting of the user and the contact. In another embodiment, the description of how a user met a contact includes an identification of a third party who introduced the user to the contact. The third party may be an additional contact of the user whose contact details are also maintained in a contact entry of the contact management system.

At block 304, the determination module 204 determines a suggested entry to the data field of the contact management system responsive to at least one signal of the plurality of signals received from the databases 110, 112, and 114 exceeding a threshold level of significance. The suggested entry to the data field of the contact management system to provide a description of how the user met the contact.

At block 306, the user interface module 102 may automatically provide display data to display the suggested entry of the data field of the contact management system determined by the determination module 204. According to some embodiments, the user may then be given the ability to confirm, reject or edit the description of how the user met the contact, as presented in the suggested entry.

Figure 4:
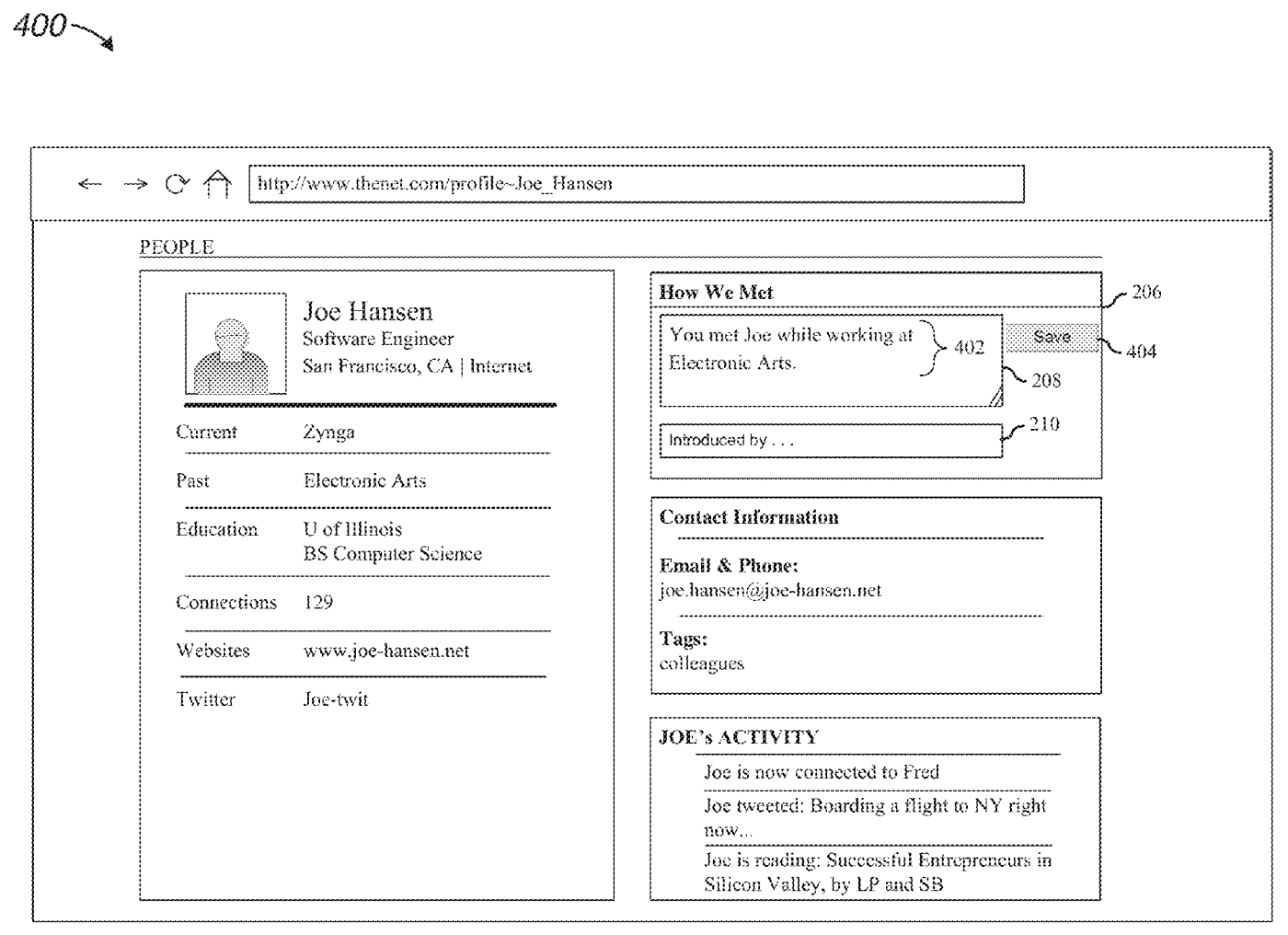

FIG. 4 is an interface diagram illustrating a user interface of the contact management system displaying a contact entry 400 maintained by a contact management system, as may be used in an example embodiment. The contact entry 400 may be presented to a device of a user by the user interface module 104. As illustrated in FIG. 4, contact entry 400 may include several data field entries, each of which may provide certain details about the contact corresponding to contact entry 400. Particularly, data entry box 206 may provide details related to the initial meeting of a user and the contact corresponding to contact entry 400.

In an example embodiment, data entry box 206 includes data entry field 208, which is a field designated to provide details of how and when a user initially met the contact corresponding to contact entry 400. Suggestion module 106 may determine a suggested entry 402 to be presented in data entry field 208 by the user interface module 104. In this example embodiment, the suggestion module 106 has determined that the user may have met the contact while working for the same employer. Consistent with embodiments of the present disclosure, the user may confirm the suggested entry 402 by clicking save button 404. In another embodiment, the user may edit suggested entry 402 to provide a more accurate description of how the user initially met the contact. In yet another embodiment, the user may completely reject suggested entry 402 and provide the user's own description of the initial meeting of the contact in data entry field 208.

As illustrated in FIG. 4, data entry box 206 also includes data entry field 210, which is designated to provide the name of a third party that may have introduced the user to the contact. In some embodiments, the third party may be an additional contact of the user that may also have a corresponding contact entry maintained by the contact management system 102. The suggestion module 106 may also provide the user with a suggested entry to identify the third party that introduced the contact to the user. Similar to suggested entry 402, the user may confirm, edit or reject this suggestion.

Consistent with aspects of this embodiment, third party contacts may be tagged as a valued contact of the user if the third party contact has introduced the user to multiple other contacts. A third party contacts who regularly introduces the user to additional contacts may be tagged by the contact management system 102 as a valued contact because of the high likelihood that the third party contact may again introduce the user to additional contacts that will be of value to the user. For example, a third party contact who has introduced the user to several contacts, many of whom have entered into a sales contract with the user, may be tagged as a valued contact because the third party contact will likely introduce the user to additional contacts, thus providing additional sales opportunities to the user.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 5:
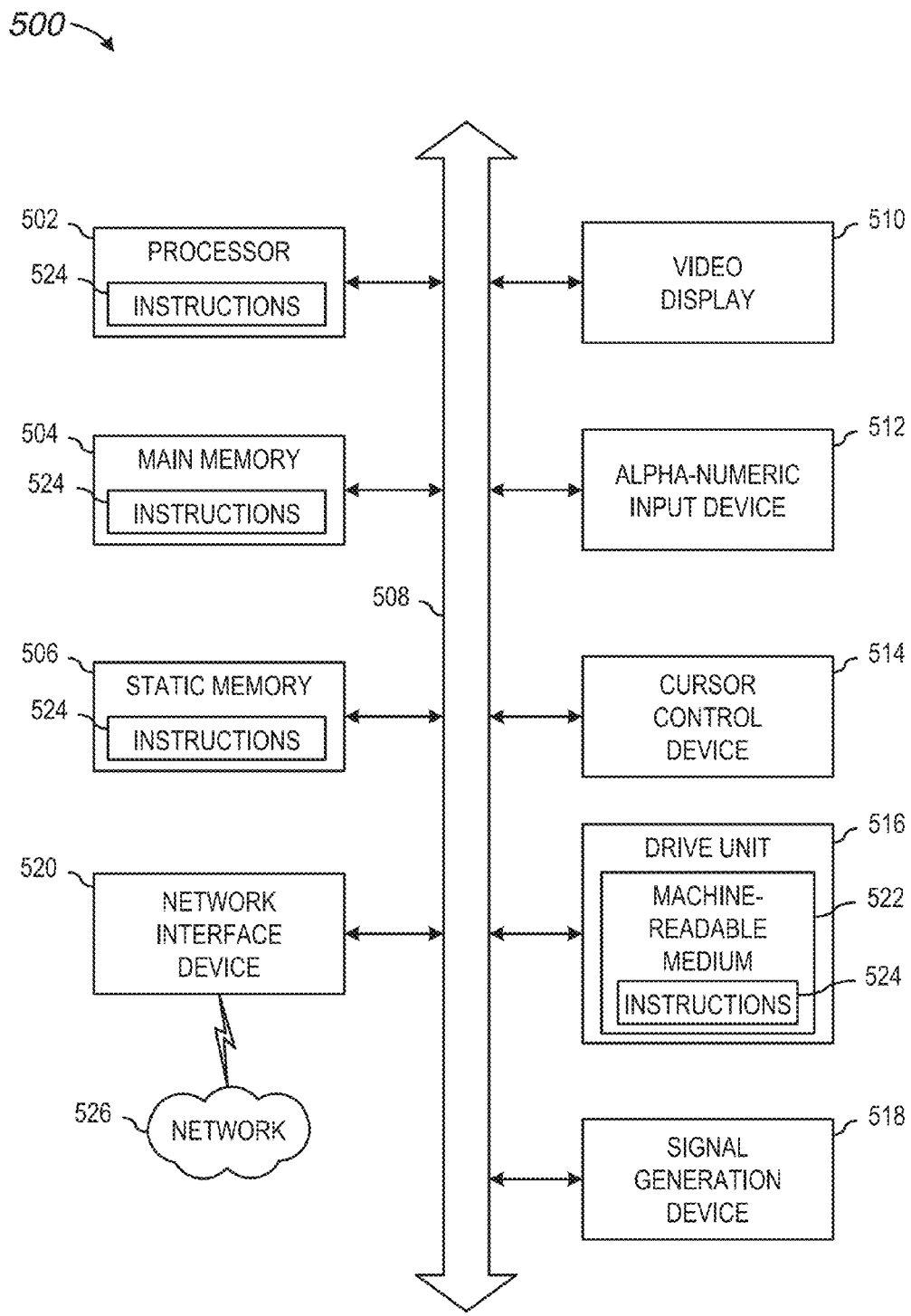
FIG. 5 is a block diagram of machine in the example form of a computer system within which a set instructions, for causing the machine to perform any one or more of the methodologies discussed herein, may be executed.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

What is claimed is:

1. A method comprising:
   obtaining a plurality of signals from one or more databases, the plurality of signals comprising data associated with a user, the data comprising an electronic communication history between the user and a contact maintained by a contact management system, the electronic communication history comprising at least one of an electronic mail (e-mail) message, an instant message, a chat message, a social networking message, a short message service (SMS) message, and a phone call;
   determining, by one or more processors, a level of significance of each of the plurality of signals in providing a description of how the user initially met the contact maintained by the contact management system;
   responsive to at least one signal of the plurality of signals exceeding a threshold level of significance, determining a suggested entry for a data field of the contact management system using the at least one signal, the determining of the suggested entry for the data field comprising:
      inferring, by analyzing the electronic communication history, how and when the user initially met the contact based on at least one of the e-mail message, the instant message, the chat message, the social networking message, the SMS message, and the phone call, and
      identifying a third party that introduced the user to the contact, the suggested entry being the description of how the user initially met the contact, the description specifying when the user initially met the contact and including an identifier of the third party that introduced the user to the contact; and
   automatically providing display data to display the suggested entry for the data field of the contact management system.

2. The method of claim 1, further comprising:
   displaying a user interface element that provides the user with an ability to confirm or reject the suggested entry.

3. The method of claim 1, further comprising:
   displaying a user interface element that provides the user with an ability to edit the suggested entry.

4. The method of claim 1, wherein the plurality of signals further include at least one of an educational background, an employment history, a calendar event notification, a schedule history, social network connections, social network connection timing, and social graph data.

5. The method of claim 1, wherein the determining the suggested entry further includes inferring, based on the user and the contact each having an email address with a domain name corresponding to the same school, that the user and the contact attended a school together.

6. The method of claim 1, wherein the determining the suggested entry is based on inferring that the user and the contact of the user attended an event together.

7. The method of claim 1, wherein the communication history includes an email received from an additional contact of the user for purposes of an introduction of the user and the contact of the user and the analyzing of the communication history includes determining that an email address of the contact was included as an addressee of the email or included as a carbon copy recipient of the email.

8. The method of claim 7, further comprising:
tagging the additional contact as a valued contact.

9. The method of claim 1, wherein the determining the suggested entry is based on information associated with creation of a social network connection between the user and the contact.

10. The method of claim 9, wherein the information associated with creation of a social network connection includes analysis of a timing of the creation of the social network connection.

11. The method of claim 1, wherein the level of significance is based on a timing of the inclusion of the contact into the contact management system.

12. The method of claim 1, wherein the determining the suggested entry inferring that the user and the contact are employed by a common employer.

13. The method of claim 12, wherein the inferring that the user and the contact are employed at the same employer is based on the user and the contact being associated with a group of additional users each being the common employer.

14. A non-transitory machine-readable storage medium embodying a set of instructions, that when executed by at least one processor, cause at least one processor to perform operations comprising:
obtaining a plurality of signals from one or more databases, the plurality of signals comprising data associated with a user, the data comprising an electronic communication history between the user and a contact maintained by a contact management system, the electronic communication history comprising at least one of an electronic mail (e-mail) message, an instant message, a chat message, a social networking message, a short message service (SMS) message, and a phone call;
determining a level of significance of each of the plurality of signals in providing a description of how the user met the contact maintained by the contact management system;
responsive to at least one signal of the plurality of signals exceeding a threshold level of significance, determining a suggested entry for a data field of the contact management system, using the at least one signal, the determining of the suggested entry for the data field comprising:
inferring, by analyzing the electronic communication history, how and when the user initially met the contact based on at least one of the e-mail message, the instant message, the chat message, the social networking message, the SMS message, and the phone call, and
identifying a third party that introduced the user to the contact, the suggested entry being the description of how the user initially met the contact, the description specifying when the user initially met the contact and including an identifier of the third party that introduced the user to the contact; and
automatically providing display data to display the suggested entry for the data field of the contact management system.

15. The non-transitory machine-readable storage medium of claim 14, further comprising providing the user with an ability to edit the suggested entry.

16. The non-transitory machine-readable storage medium of claim 14, wherein the determining of the level of significance of each of the plurality of signals includes assigning a weight to each signal based on the level of significance of the signal in providing a description of how the user met the contact.

17. The non-transitory machine-readable storage medium of claim 14, wherein the level of significance is based on a timing of the inclusion of the contact into the contact management system.

18. A system comprising:
at least one processor for executing instructions;
a memory device in communication with the at least one processor and storing instructions representing a suggestion module, which, when executed by the at least one processor is to perform operations comprising:
obtaining a plurality of signals from one or more databases, the plurality of signals comprising data associated with a user, the data comprising an electronic communication history between the user and a contact maintained by a contact management system, the electronic communication history comprising at least one of an electronic mail (e-mail) message, an instant message, a chat message, a social networking message, a short message service (SMS) message, and a phone call;
determining a level of significance of each of the plurality of signals in providing a description of how the user initially met the contact maintained by the contact management system;
responsive to at least one signal of the plurality of signals exceeding a threshold level of significance, determining a suggested entry for a data field of the contact management system using the at least one signal, the determining of the suggested entry for the data field comprising:
inferring, by analyzing the electronic communication history, how and when the user initially met the contact based on at least one of the e-mail message, the instant message, the chat message, the social networking message, the SMS message, and the phone call, and
identifying a third party that introduced the user to the contact, the suggested entry being the description of how the user initially met the contact, the description specifying when the user initially met the contact and including an identifier of the third party that introduced the user to the contact; and
causing the suggested entry to be displayed.

* * * * *